United States Patent
Jang et al.

(10) Patent No.: US 9,124,092 B2
(45) Date of Patent: Sep. 1, 2015

(54) PULSE WIDTH MODULATION CONTROLLER

(75) Inventors: Sang Hyun Jang, Gyeonggi-do (KR); Ho Deuk Song, Seoul (KR); Jong Hoon Chae, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 242 days.

(21) Appl. No.: 13/614,864

(22) Filed: Sep. 13, 2012

(65) Prior Publication Data
US 2013/0147414 A1 Jun. 13, 2013

(30) Foreign Application Priority Data
Dec. 9, 2011 (KR) .......................... 10-2011-0131876

(51) Int. Cl.
| | | |
|---|---|---|
| H02P 7/00 | (2006.01) |
| H02H 7/085 | (2006.01) |
| H02P 27/08 | (2006.01) |
| H02H 7/08 | (2006.01) |

(52) U.S. Cl.
CPC .............. H02H 7/085 (2013.01); H02H 7/0833 (2013.01); H02P 27/08 (2013.01)

(58) Field of Classification Search
USPC ............ 318/599, 400.29, 432, 434, 519
See application file for complete search history.

(56) References Cited

U.S. PATENT DOCUMENTS

| | | | | |
|---|---|---|---|---|
| 4,972,133 A * | 11/1990 | Hirota et al. | ................... | 318/646 |
| 5,889,376 A * | 3/1999 | Takatsuka et al. | ............ | 318/434 |
| 5,932,979 A * | 8/1999 | Sun | .................. | 318/400.23 |
| 5,969,919 A * | 10/1999 | Kobayashi et al. | ............ | 361/23 |
| 6,094,021 A * | 7/2000 | Noro et al. | ................. | 318/400.29 |
| 6,291,960 B1 * | 9/2001 | Crombez | ..................... | 318/599 |
| 6,366,038 B1 * | 4/2002 | Bohm | ........................ | 318/400.3 |
| 6,577,024 B2 * | 6/2003 | Kikuta et al. | ................. | 307/10.1 |
| 7,023,152 B2 * | 4/2006 | Sunaga et al. | .................. | 318/34 |
| 7,154,240 B2 * | 12/2006 | Watanabe | ..................... | 318/434 |
| 7,207,412 B2 * | 4/2007 | Uryu | ............................ | 180/443 |
| 7,759,891 B2 * | 7/2010 | Serizawa et al. | ............. | 318/434 |
| 8,138,700 B2 * | 3/2012 | Monier et al. | ........... | 318/400.26 |
| 8,917,038 B2 * | 12/2014 | Fukuoka et al. | ............. | 318/139 |

FOREIGN PATENT DOCUMENTS

| | | |
|---|---|---|
| JP | H07-288901 A | 10/1995 |
| JP | 2010-098907 A | 4/2010 |
| KR | 10-2008-0022753 A | 3/2008 |

* cited by examiner

*Primary Examiner* — Bentsu Ro
*Assistant Examiner* — Thai Dinh
(74) *Attorney, Agent, or Firm* — Mintz Levin Cohn Ferris Glovsky and Popeo, P.C.; Peter F. Corless

(57) ABSTRACT

Disclosed herein is a Pulse Width Modulation (PWM) controller. The PWM controller includes a plurality of Field Effect Transistors (FETs) and an FET driver. A comparator compares a current flowing through the FETs with an overcurrent reference value, and microcomputer controls a motor and a circuit protection function, and turns off the FET driver when the current flowing through the FETs is greater than the overcurrent reference value as a result of comparison by the comparator.

8 Claims, 3 Drawing Sheets

PRIOR ART

PRIOR ART

PULSE WIDTH MODULATION CONTROLLER

CROSS-REFERENCE TO RELATED APPLICATIONS

The present application claims priority to Korean Patent Application No. 10-2011-0131876 filed on Dec. 9, 2011, the entire contents of which is incorporated herein for purposes by this reference.

BACKGROUND

1. Field of the Invention

The present invention relates to a Pulse Width Modulation (PWM) controller, configured to protect power terminals or signal lines against shorts that may occur in a motor controller, without requiring a separate element to do so, thus decreasing the price of the motor controller and improving the reliability of the motor controller.

2. Description of the Related Art

Motor controllers, which are currently used for the blower motor or the like of a vehicle, are of the linear control type and typically perform control using a single large-capacity Field Effect Transistor (FET). Since these motor controllers have a large-capacity FET, they are designed so that even when a short circuit occurs in the power line and the signal line of an FET controller, the FET is not broken down and the internal temperature element thereof, however, is broken down.

Further, since these motor controllers use only a single FET, they have a simplified configuration and are easily controlled. However, the power dissipation increases in these motor controllers. When power dissipation increases, fuel efficiency decreases during operation of, e.g., an air conditioner. Thus, research has been conducted into an object which is able to reduce power dissipation and improve fuel efficiency using a Pulse Width Modulation (PWM) control scheme. When a PWM control scheme is used, however, in a motor controller, the price of the overall controller increases, because a short circuit protection function must be applied using an FET which has a suitable capacity and logic instead of a large capacity FET. FIG. 2 is a graph illustrating the current flowing through a PWM controller and FIG. 3 is a circuit diagram illustrating a conventional PWM controller. Referring to FIG. 2, the current may have a normal state, an overcurrent state and a short state. As can be seen from the graph, the current of the PWM controller has the tendency to increase depending on the duty ratio. As shown in FIG. 3, when both terminals of a motor are short circuited because of worker error or the like, an overcurrent flows therethrough and then a low-side FET L may burn when the low-side FET L is turned on. Therefore, when it is determined by a current sensor that an overcurrent is flowing therethrough, the low-side FET L must be forcibly turned off during the time period in which the low-side FET to L can resist the overcurrent. Typically, this time is several tens of microseconds or less. Therefore, a method of stably implementing such an overcurrent protection circuit at a low cost is required.

The foregoing is intended merely to aid in the better understanding of the background of the present invention, and is not intended to mean that the present invention falls within the purview of the related art that is already known to those skilled in the art.

SUMMARY

Accordingly, the present invention has been made keeping in mind the above problems, and an object of the present invention is to provide a pulse width modulation (PWM) controller, which enables implementation of a function for protecting power terminals or signal lines against short circuits that may occur in a motor controller without requiring a separate element to do so, thus decreasing the price of the motor controller and improving the reliability of the motor controller in the process.

In order to accomplish the above object, the present invention provides a Pulse Width Modulation (PWM) controller that includes a plurality of Field Effect Transistors (FETs) and an FET driver; a comparator configured to compare a current flowing through the FETs with an overcurrent reference value; and a microcomputer configured to perform a function of controlling a motor and a circuit protection function, and to turn off the FET driver when the current flowing through the FETs is greater than the overcurrent reference value as a result of a comparison by the comparator.

Further, the present invention provides another Pulse Width Modulation (PWM) controller, including a plurality of Field Effect Transistors (FETs) and an FET driver; a comparator configured to compare a current flowing through the FETs with an overcurrent reference value; a microcomputer configured to control a motor and a circuit protection function; and a switch configured to cut off a connection between the microcomputer and the FET driver when the current flowing through the FETs is greater than the overcurrent reference value as a result of a comparison by the comparator.

Preferably, the overcurrent reference value for the comparator may be set based on an FET having a largest capacity. The comparator may determine that the current flowing through the FETs is greater than the overcurrent reference value when both terminals of the motor are short circuited. Alternatively, the comparator may determine that the current flowing through the FETs is greater than the overcurrent reference value when a negative terminal of the motor and a bias voltage terminal of a battery are short circuited.

Preferably, the plurality of FETs may include a low-side FET and a high-side FET, and the overcurrent reference value for the comparator may be set based on a capacity of the low-side FET. In this case, the comparator may determine that current flowing through the low-side FET is greater than the overcurrent reference value when both terminals of the motor are short circuited. The comparator may also determine that current flowing through the low-side FET is greater than the overcurrent reference value when a negative terminal of the motor and a bias voltage terminal of a battery are shorted.

The above described PWM controller allows for protection of power terminals or signal lines against short circuiting that may occur in a motor controller without requiring a separate element to do so, thus decreasing the price of the motor controller and improving the reliability of the motor controller.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, a PWM controller according to embodiments of the present invention will be described in detail with reference to the attached drawings.

It is understood that the tem "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
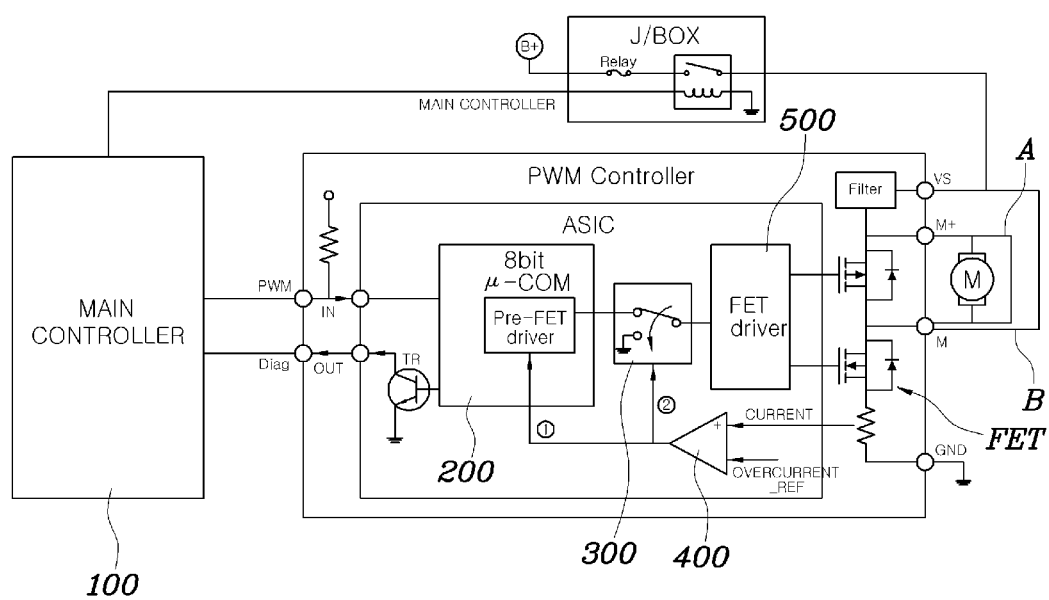
FIG. 1 is a circuit diagram illustrating a PWM controller according to an exemplary embodiment of the present invention.

FIG. 1 is a circuit diagram illustrating a PWM controller according to an exemplary embodiment of the present invention. The PWM controller of the present invention includes a plurality of Field Effect Transistors (FETs) and an FET driver 500, a comparator 400, and a microcomputer 200. The comparator 400 compares a current flowing through the FETs with an overcurrent reference value. The microcomputer 200 controls a motor M and a circuit protection function, and turns off the FET driver 500 when the current flowing through the FETs is greater than the overcurrent reference value as a result of the comparison by the comparator 400.

Generally, in the case of a Metal-Oxide-Semiconductor Field-Effect Transistor (MOS FET), a diode component is structurally present in a direction from a source to a drain when the MOS FET is operated at high frequency. Therefore, when a switching element is implemented as a MOS FET, a diode that typically is required to be connected in parallel to the switching element may be omitted, thus simplifying the construction of the circuit. Further, when an FET is turned on, the drain (load) and the source thereof are electrically connected to each other, so that current may flow bidirectionally. However, when the FET is turned off, current cannot flow from the drain to the source. Current can, however, flow through a parasitic diode from the source to the drain.

The present invention can be applied to the MOS FET, and is intended to prevent the disconnection of a circuit from occurring when, as in the circuit shown in the drawing, a short (case A) occurs between both terminals M+ and M− of the motor M and a short (case B) occurs between the negative terminal M− of the motor M and the bias voltage terminal VS of a battery.

Conventionally, a separate high-capacity FET is typically provided and is used to implement a protection circuit. However, in the present invention, the comparator 400 for comparing the current flowing through the FETs with the overcurrent reference value is set instead, and the microcomputer 200 controls the motor M and the circuit protection function.

In this case, a pre-FET driver is set to turn off the FET driver 500 when the current flowing through the FETs is greater than the overcurrent reference value as a result of the comparison by the comparator 400, thus performing a protection function.

Figure 2:
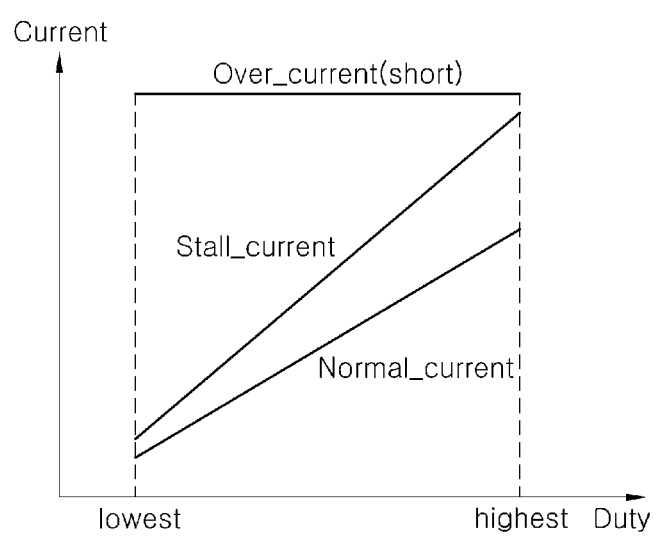
FIG. 2 is a graph illustrating current flowing through the PWM controller.
Figure 3:
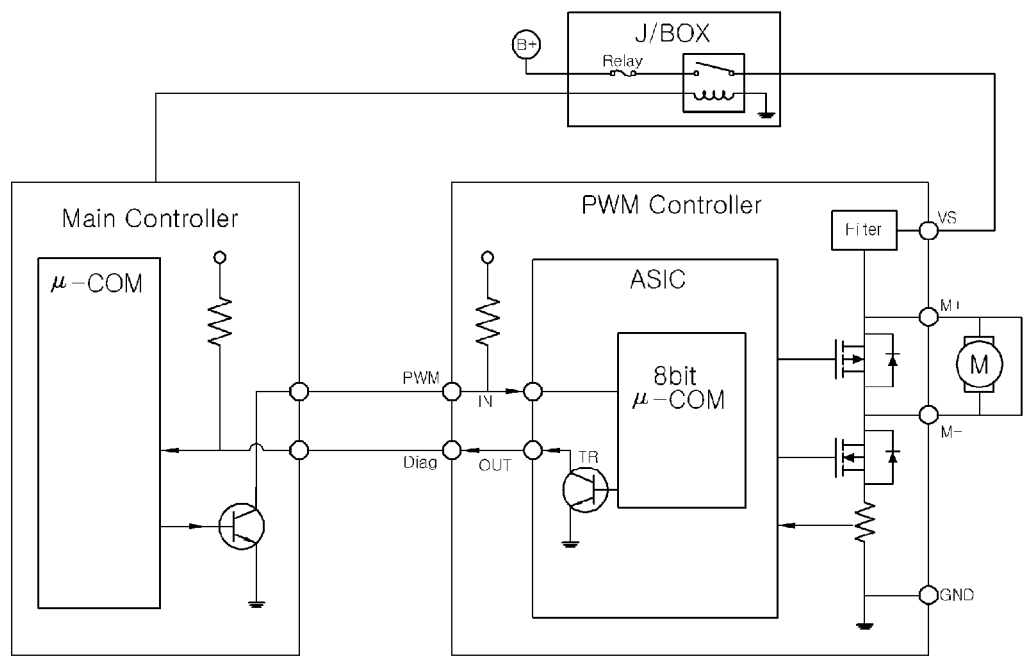
FIG. 3 is a circuit diagram illustrating a conventional PWM controller.

As shown in FIG. 2, each FET has a tendency for a current to increase as the duty ratio of the FET increases, and the current corresponding to a predetermined level has a threshold level as an overcurrent. Therefore, when such an overcurrent is initially detected and a signal is interrupted using the characteristics of the FET, the circuit may be protected when shorts corresponding to the illustrated case occur.

In detail, as shown in FIG. 1, the plurality of FETs according to the present invention may be composed of a low-side FET L and a high-side FET H, and the motor M may be operated in response to the ON/OFF operations of the low-side FET L. Further, since current flows through a shunt resistor only when the low-side FET L is turned on, the current flows into the comparator 400 at that time. Meanwhile, the high-side FET H is an FET functioning to form a pass through which energy flows into the motor M when the low-side FET L is turned off (that is, during an interval in which power is not applied to the motor M so as to control the speed of the motor M). In some cases, the high-side FET H may be implemented as a diode for the sake of cost reduction, ease of control, etc. Unless this pass is formed, a high reverse voltage may be induced in the motor M and then the low-side FET L may be broken down when the low-side FET L is turned off. Accordingly, the overcurrent reference value for the comparator 400 may be set based on the capacity of the low-side FET L.

When both the terminals M+ and M− of the motor M are short circuited, the comparator 400 determines that current flowing through the low-side FET L is greater than the overcurrent reference value. Alternatively, when the negative terminal M− of the motor M and the bias voltage terminal VS of the battery are short circuited, the comparator 400 also determines that the current flowing through the low-side FET L is greater than the overcurrent reference value.

The above described functions may also be performed by another exemplary embodiment of the present invention. A PWM controller according to another embodiment of the present invention includes a plurality of FETs and an FET driver 500, a comparator 400, a microcomputer 200, and a switch 300. The comparator 400 compares a current flowing through the FETs with an overcurrent reference value. The microcomputer 200 performs a motor control function and a circuit protection function. Finally, the switch 300 cuts off a connection between the microcomputer and the FET driver when the current flowing through the FETs is greater than the overcurrent reference value as a result of the comparison by the comparator.

In this case, the switch 300 is configured to cut off the connection between the microcomputer and the FET driver when the current flowing through the FETs is greater than the overcurrent reference value as a result of the comparison by the comparator, thus protecting the circuit by disconnecting the microcomputer from the FET driver.

Further, the PWM controller of the present invention may set the overcurrent reference value for the comparator 400 based which FET has the largest capacity, thus enabling the protection function to be more stably and conservatively implemented.

Furthermore, the comparator 400 may enable a separate high-capacity FET to be omitted by determining that the current flowing through the FETs is greater than the overcurrent reference value when both terminals M+ and M− of the motor M are short circuited, or by determining that the current flowing through the FETs is greater than the overcurrent reference value when the negative terminal M− of the motor M and the bias voltage terminal VS of the battery are short circuited.

Meanwhile, the PWM controller of the present invention may incidentally implement a protection function even when any one of the following short circuiting events occur:

(1) A PWM/Diagnosis short: a PWM/Diagnosis short occurs when a PWM signal from a main controller is input as a Diagnosis signal to the main controller, so that the main controller can determine that a PWM signal line and a Diagnosis signal line have been short circuited.

(2) A PWM/Vbatt(VS) short: when a PWM signal line and a Vbatt line are short circuited, the input of the PWM controller always has a duty ratio of 0%. In this case, since the duty ratio is always 0%, the PWM controller is not damaged, and it can be sensed that an abnormality has occurred in the motor.

(3) A PWM/GND short: in this case, the input of the PWM controller always has a duty ratio of 100%, the PWM controller is not damaged, and the motor always moves at the highest speed, and thus it can be sensed that an abnormality has occurred in the motor.

(4) A PWM/M+ short: this case is identical to that of the PWM/Vbatt short.

(5) A Diagnosis/Vbatt short: in this case, a Diagnosis signal always has a duty ratio of 0%. When the protection function of the PWM controller, such as protection against overvoltage, overcurrent, low voltage or high temperature, is operated, the main controller cannot receive a Diagnosis signal, and thus the main controller cannot determine whether the PWM controller is defective. However, since the motor is not moving due to the operation of the protection function of the PWM controller, whether an abnormality has occurred may be sensed. As a result, damage does not occur in the PWM controller.

(6) A Diagnosis/GND short: in this case, since a Diagnosis signal always has a duty ratio of 100% (low), the main controller may sense whether an abnormality has occurred, and then stop the PWM controller accordingly.

(7) A Diagnosis/M+ short: this case is identical to that of the Diagnosis/Vbatt short.

(8) A Diagnosis/M− short: in this case, the voltage level of the M− terminal is the inverse of a PWM input signal. When the voltage of the M− terminal is input as a Diagnosis signal to the main controller, the main controller may determine that an abnormality has occurred in the PWM controller. In this case, the PWM controller is not damaged, and it can be determined whether an abnormality has occurred in the motor.

(9) A Vbatt(VS)/GND short: in this case, the PWM controller is not damaged, but a fuse melts due to the short that occurred at the power terminal.

Accordingly, the above described PWM controller(s) having the above-described construction protect power terminals or signal lines against the short circuiting that may occur in a motor controller without requiring a separate element to do so, thus decreasing the price of the motor controller and improving the reliability of the motor controller.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Pulse Width Modulation (PWM) controller, comprising:
   a plurality of Field Effect Transistors (FETs) and an FET driver;
   a comparator configured to compare a current flowing through the FETs with an overcurrent reference value;
   a microcomputer configured to control a motor and perform a circuit protection function for the PWM controller; and
   a switch configured to cut off a connection between the microcomputer and the FET driver when the current flowing through the FETs is greater than the overcurrent reference value as a result of comparison by the comparator.

2. The PWM controller according to claim 1, wherein the overcurrent reference value for the comparator is set based on which of FET of the plurality of FETs has a largest capacity.

3. The PWM controller according to claim 1, wherein the comparator is configured to determine that the current flowing through the FETs is greater than the overcurrent reference value when both terminals of the motor are short circuited.

4. The PWM controller according to claim 1, wherein the comparator is configured to determine that the current flowing through the FETs is greater than the overcurrent reference value when a negative terminal of the motor and a bias voltage terminal of a battery are short circuited.

5. The PWM controller according to claim 1, wherein the plurality of FETs comprise a low-side FET and a high-side FET.

6. The PWM controller according to claim 5, wherein the overcurrent reference value for the comparator is set based on a capacity of the low-side FET.

7. The PWM controller according to claim 6, wherein the comparator is configured to determine that current flowing through the low-side FET is greater than the overcurrent reference value when both terminals of the motor are short circuited.

8. The PWM controller according to claim 6, wherein the comparator is configured to determine that current flowing through the low-side FET is greater than the overcurrent reference value when a negative terminal of the motor and a bias voltage terminal of a battery are short circuited.

* * * * *